United States Patent
Fine et al.

(10) Patent No.: US 9,237,165 B2
(45) Date of Patent: Jan. 12, 2016

(54) MALICIOUS ATTACK PREVENTION THROUGH CARTOGRAPHY OF CO-PROCESSORS AT DATACENTER

(71) Applicant: Empire Technology Development LLC, Wilmington, DE (US)

(72) Inventors: Kevin S. Fine, Yverdon (CH); Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/371,730

(22) PCT Filed: Nov. 6, 2013

(86) PCT No.: PCT/US2013/068806
§ 371 (c)(1),
(2) Date: Jul. 10, 2014

(87) PCT Pub. No.: WO2015/069244
PCT Pub. Date: May 14, 2015

(65) Prior Publication Data
US 2015/0128268 A1 May 7, 2015

(51) Int. Cl.
*H04L 29/06* (2006.01)
*G06F 9/455* (2006.01)

(52) U.S. Cl.
CPC ........ *H04L 63/1441* (2013.01); *G06F 9/45533* (2013.01)

(58) Field of Classification Search
CPC .................................................. H04L 63/1441
USPC ............................................................ 726/23
See application file for complete search history.

(56) References Cited

U.S. PATENT DOCUMENTS

| 7,652,499 | B2  | 1/2010 | Schmit et al. |
| 8,479,069 | B2* | 7/2013 | Miller et al. ................... 714/734 |
| 8,499,173 | B2  | 7/2013 | Caci |
| 2009/0216910 | A1 | 8/2009 | Duchesneau |

FOREIGN PATENT DOCUMENTS

EP    1013023 B1    10/2005

OTHER PUBLICATIONS

"Idea to Entrepreneurship," Nimbix, accessed at http://www.slideshare.net/mitdfw/mit-enterprise-forum-startup-presentation-nimbix, Mar. 10, 2012, pp. 1-15.

(Continued)

*Primary Examiner* — Longbit Chai
(74) *Attorney, Agent, or Firm* — Turk IP Law, LLC (57) ABSTRACT

Technologies are directed to prevention of malicious attacks through cartography of co-processors at a datacenter. According to some examples, configuration data to create a co-processor at a field programmable gate array (FPGA) may be received at a configuration controller. The configuration controller may determine unused arrangements for the co-processor and unused placements at the FPGA corresponding to the unused arrangements. The used arrangements and the unused placements, associated with a type of the co-processor, may be stored in a configuration matrix. One of the unused arrangements and one of the unused placements corresponding to the selected unused arrangement may then be selected by the configuration controller to create the co-processor.

20 Claims, 8 Drawing Sheets

(56) References Cited

OTHER PUBLICATIONS

Becker, T., et al., "Enhancing Relocatability of Partial Bitstreams for Run-Time Reconfiguration," 15th Annual IEEE Symposium on Field-Programmable Custom Computing Machines IEEE, pp. 35-44 (2007).

Bernstein, K., et al. "High-performance CMOS variability in the 65-nm regime and beyond," IBM journal of research and development, vol. 50, No. 4/5, pp. 433-449, Sep. 2006.

Goulding-Hotta, N., et al., "The GreenDroid Mobile Application Processor: An Architecture for Silicon's Dark Future," IEEE Micro, vol. 31, Issue 2, pp. 86-95, Mar./Apr. 2011.

Ion, I., et al., "Home is safer than the cloud!: privacy concerns for consumer cloud storage," Proceedings of the Seventh Symposium on Usable Privacy and Security, ACM, pp. 20, Jul. 2011.

Koester, M., et al., "Design Optimizations for Tiled Partially Reconfigurable Systems," IEEE Transactions on Very Large Scale Integration (VLSI) Systems, vol. 19, No. 6, pp. 1048-1061, Jun. 2011.

Kumar, S.S., et al., "Extended Abstract: The butterfly PUF Protecting IP on every FPGA," IEEE International Workshop on Hardware-Oriented Security and Trust, pp. 67-70 (2008).

Lysaght, P., et al., "Invited Paper: Enhanced Architectures, Design Methodologies and CAD Tools for Dynamic Reconfiguration of XILINX FPGAs," IEEE International Conference on Field Programmable Logic and Applications, pp. 1-6 (2006).

Mehta, N., "An Ultra-Low-Energy, Variation-Tolerant FPGA Architecture Using Component-Specific Mapping,"California Institute of Technology, pp. 133, Aug. 2012.

Note, J-B., and Rannaud, É., "From the bitstream to the netlist," Proceedings of the 16th international ACM/SIGDA symposium on Field programmable gate arrays, ACM, pp. 8 (2008).

Pnevmatikatos, D., et al., "FASTER: Facilitating Analysis and Synthesis Technologies for Effective Reconfiguration," IEEE 15th Euromicro Conference on Digital System Design (DSD), pp. 234-241 (2012).

Ristenpar, T., et al., "Hey, You, Get Off of My Cloud: Exploring Information Leakage in Third-Party Compute Clouds," Proceedings of the 16th ACM conference on Computer and communications security, pp. 199-212, Nov. 2009.

Taher, M., and El-Ghazawi, T., "Virtual Configuration Management: A Technique for Partial Runtime Reconfiguration," IEEE Transactions on Computing, vol. 58, No. 10, pp. 1398-1410, Oct. 2009.

Wood, L., "FPGAs Kick Wall Street Into High Gear," accessed at http://www.datacenteracceleration.com/author.asp?section_id=2431&doc_id=251916, Oct. 4, 2012, pp. 1-3.

Yu, H., "An FPGA Chip Identification Generator Using Configurable Ring Oscillators," IEEE Transactions on Very Large Scale Integration (VLSI) Systems, vol. 20, No. 12 pp. 2198-2207, Jan. 2012.

Zhang, Y., et al., "Cross-VM Side Channels and Their Use to Extract Private Keys," Proceedings of the 2012 ACM conference on Computer and communications security, pp. 305-316, Oct. 2012.

International Search Report with written Opinion for International Application No. PCT/US2013/068806 mailed on May 5, 2014.

\* cited by examiner

MALICIOUS ATTACK PREVENTION THROUGH CARTOGRAPHY OF CO-PROCESSORS AT DATACENTER

This Application is the National Stage filing under 35 US.C. §371 of PCT Application Ser. No. PCT/US13/68806 filed on Nov. 6, 2013. The PCT application is hereby incorporated by reference in its entirety.

BACKGROUND

Unless otherwise indicated herein, the materials described in this section are not prior art to the claims in this application and are not admitted to be prior art by inclusion in this section.

A cloud infrastructure provider may leverage economies of scale to provide dynamic and on-demand computing resources at low cost. Virtualization is one of the tools that may be utilized by an infrastructure provider for increased efficiency and enhanced performance. Virtual machines (VMs) from multiple customers may share physical resources such as field gate programmable arrays (FPGAs) to configure co-processors for additional computing capacity. However, co-processors may be used to map shared resources by malicious attackers using fingerprinting methods. This potential weakness may result in customers of datacenters being wary of shared resources' susceptibility to malicious attacks through cartography. A principle obstacle preventing customers from migrating to cloud computing is the fear of spying and malicious attacks from other consumers.

SUMMARY

The present disclosure generally describes techniques for malicious attack prevention through cartography of co-processors at a datacenter.

According to some examples, a method is provided to prevent malicious attacks through cartography of co-processors. An example method may include receiving a configuration to create a co-processor at a field programmable gate array (FPGA), determining unused arrangements for the co-processor, determining unused placements at the FPGA corresponding to the unused arrangements, storing the unused arrangements and the unused placements in a configuration matrix, where the unused arrangements and the unused placements are associated with a type of the co-processor, and selecting one of the unused arrangements and one of the unused placements corresponding to the selected unused arrangement to create the co-processor.

According to other examples, a server is provided to prevent malicious attacks through cartography of co-processors at a datacenter. The server may include a memory configured to store instructions, a controller coupled to the memory and configured to execute a configuration module. The configuration module may be configured to receive a configuration to create a co-processor at a field programmable gate array (FPGA), determine unused arrangements for the co-processor, apportion the co-processor into components with defined connection points to determine the unused arrangements, determine unused placements at the FPGA corresponding to the unused arrangements, store the unused arrangements and the unused placements in a configuration matrix, where the unused arrangements and the unused placements are associated with a type of the co-processor, and select one of the unused arrangements and one of the unused placements corresponding to the selected unused arrangement to create the co-processor.

According to some examples, a computer readable medium may store instructions to prevent malicious attacks through cartography of co-processors at a datacenter. The instructions may cause a method to be performed when executed, the method being similar to the methods described above.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to prevention of malicious attacks through cartography of co-processors at a datacenter.

Briefly stated, technologies are directed to prevention of malicious attacks through cartography of co-processors at a datacenter. According to some examples, configuration data to create a co-processor at a field programmable gate array (FPGA) may be received at a configuration controller. The configuration controller may determine unused arrangements for the co-processor and unused placements at the FPGA corresponding to the unused arrangements. The used arrangements and the unused placements, associated with a type of the co-processor, may be stored in a configuration matrix. One of the unused arrangements and one of the unused placements corresponding to the selected unused arrangement may then be selected by the configuration controller to create the co-processor.

Figure 1:
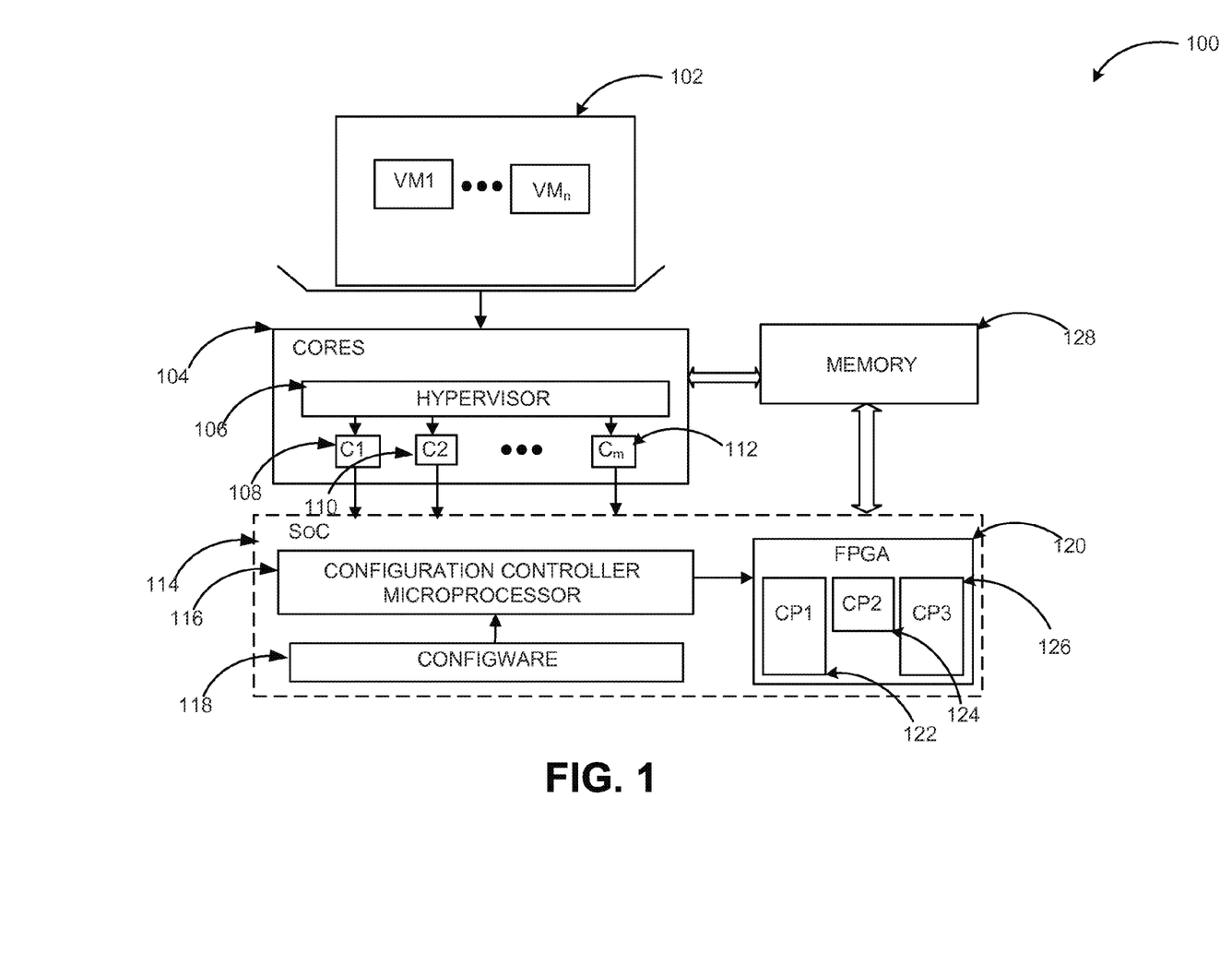
FIG. 1 illustrates an example schema of configuration of co-processors at a field programmable gate array (FPGA) of a datacenter.

FIG. 1 illustrates example schema of configuration of co-processors at a field programmable gate array (FPGA) of a datacenter, arranged in accordance with at least some embodiments described herein.

As depicted, a diagram 100 shows a functional diagram of a server at a datacenter. A hypervisor 106 may manage a multi-core array 104, sharing cores (or processors) between many consumers executing applications in virtual machines (VMs) 102. The cores may include processors that are adapted to provide computing capacity to the VMs. A VM may be a self-contained execution environment for applications and services. The hypervisor 106 may be a VM manager (VMM) that may create and execute the VMs 102. A number of the VMs 102 managed by the hypervisor 106 may be limited by available resources including number of the cores in the multi-core array 104.

The multi-core array 104 may include cores C1 (108), C2 (110) through Cm (112). A system on a chip (SoC) 114 at the datacenter may include an FPGA 120. The SoC 114 may provide an additional computation capacity to the hypervisor 106 through co-processors configured at the FPGA. The FPGA may be configured with multiple co-processors such as CP1 (122), CP2 (124), and CP3 (126). The VMs may execute instructions within the co-processors in the FPGA 120. The instructions may be communicated to the FPGA 120 through a system memory 128.

A configuration controller microprocessor 116 may configure the co-processors within the FPGA 120. The configuration controller microprocessor 116 may use a configware 118 to configure the co-processors. The configware 118 may be a software description in a memory of a co-processor to configure the FPGA 120. The configurations may include instructions to construct the co-processor within the FPGA 120 based on attributes of a co-processor such as a type of the co-processor, a function of the co-processor, and similar ones.

Allowing customers to configure co-processors onto FPGAs may expose the datacenter to security vulnerabilities. Co-processors may be capable of fingerprinting (mapping) the FPGA. Fingerprinting may include measurements to identify a layout of the FPGA. A customer capable of identifying a placement of co-processors at an FPGA may then perform cloud cartography. Cloud cartography may include mapping of the resources of the datacenter with a goal to perform attacks on other consumers. The attacks may include side-channel attacks to discover instructions executed by other VMs.

Figure 2:
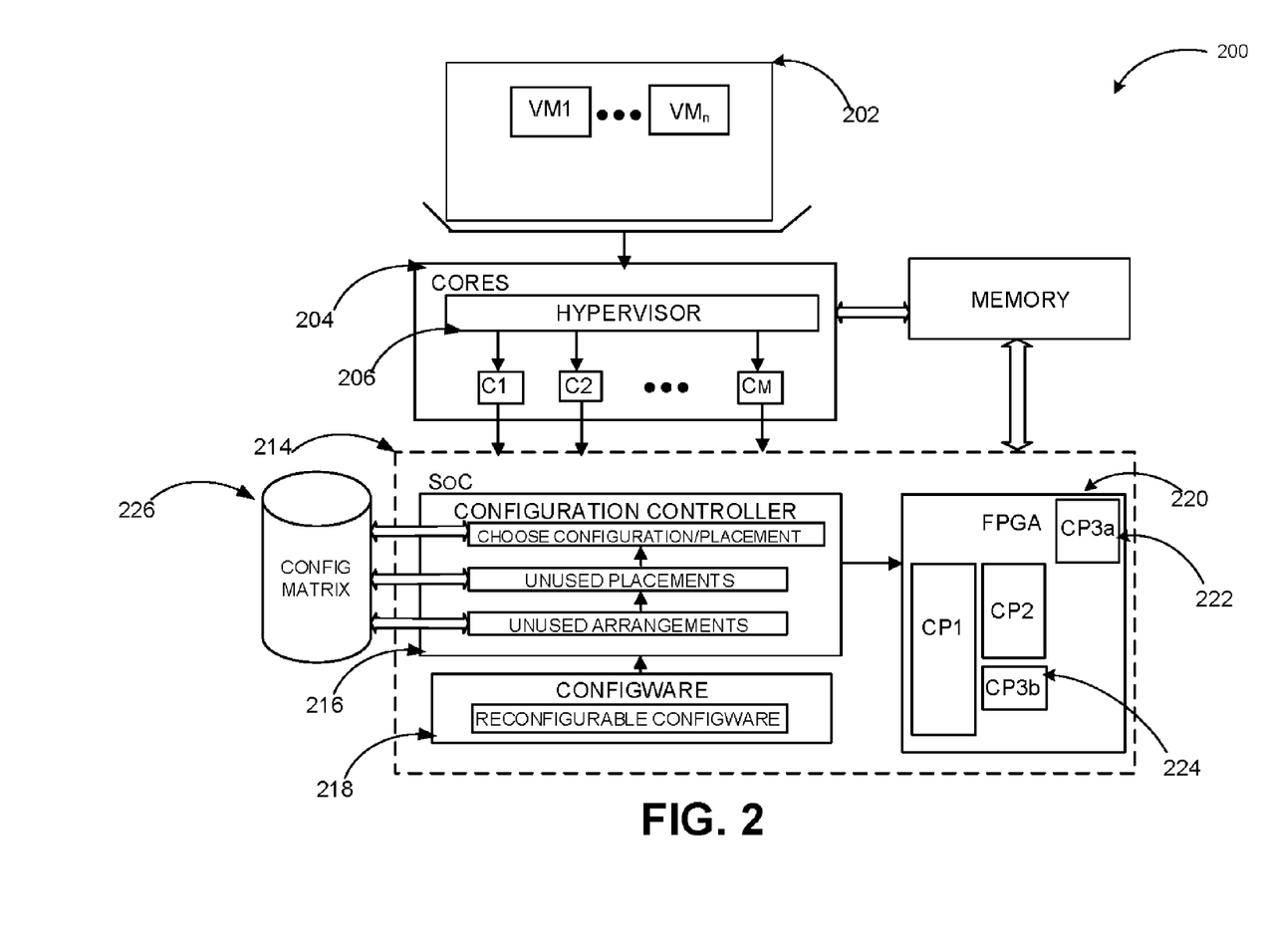
FIG. 2 illustrates an example schema of malicious attack prevention through cartography of co-processors at a datacenter.

FIG. 2 illustrates an example schema of malicious attack prevention through cartography of co-processors at a datacenter, arranged in accordance with at least some embodiments described herein.

As shown in a diagram 200, a hypervisor 206 may manage VMs 202. The hypervisor 206 may allocate resources such as cores to the VMs 202 to execute instructions at a multi-core array 204. The hypervisor 206 may also manage communications with a SoC 214 to provide additional computation capacity to the VMs 202. The hypervisor 206 may communicate with the SoC 214 to execute instructions from the VMs 202 on co-processors configured at an FPGA 220. The co-processors may provide specialized computing capacity to a VM to execute instructions at a higher speed or a volume compared to a computing capacity available through a core.

A configuration matrix 226, accessible throughout the datacenter, may store an array that enumerates configurations of co-processors for FPGAs. A configuration may be, for example, a structured file that describes one or more arrangements and one or more placements of a co-processor. The configuration matrix may be a data store or a data file. In response to receiving a request to configure a co-processor, the co-processor may be configured within the FPGA 220 by a configuration controller 216. The configuration matrix 226 may transmit to the configuration controller, unused arrangements and unused placements of the co-processor to configure in the FPGA 220. The configuration controller 216 may select a placement and an arrangement based on available room on the FPGA 220.

The configuration controller 216 may transmit the selection of the placement and the arrangement to the configuration matrix 226 and remove the selected placement and the selected arrangement from a list of configurations for subsequent use. The selection may also describe an arrangement for a co-processor CP3. The co-processor CP3 may be configured as two components CP3a 222 and CP3b 224. The placement and arrangement of the co-processor CP3 as the components CP3a 222 and CP3b 224 may prevent fingerprinting of the FPGA 220.

A reconfigurable configware 218 may be a software description of the co-processor to be configured. The configware 218 may be in form of a bitstream, which may be a binary description of circuits to be configured in the FPGA 220. In legacy systems, bitstreams may be hard coded to specify a placement of a co-processor inside the FPGA 220. However, modern methods may create bitstreams that may enable placement of components at multiple placements. Placements may include, for example, rotation of co-processors by 90, 180, or 270 degrees.

Positioning a co-processor in an alternative placement may prevent consumers from recognizing a fingerprint associated with a co-processor. In addition, components of the co-processor may be arranged in alternative arrangements during configuration of the co-processor to prevent the fingerprinting. In an example scenario, the co-processor CP3 may be divided into the components CP3a 222 and CP3b 224. The components CP3a 222 and CP3b 224 may not be placed adjacent to each other. However, the components CP3a 222 and CP3b 224 may be connected through communication connections to enable functionality of the co-processor CP3. The arrangement may be configured dynamically during configuration of the co-processor CP3. In some examples, the arrangement may not alter circuit connections. A customer may not be allowed to determine the arrangement of the components of the co-processor CP3. As such, measurements made by a fingerprinting co-processor may be blocked and the measurements may not be interpretable.

A new arrangement of components of a co-processor may be placed at other placements in the FPGA 220. In an example scenario, a number of configurations may be multiples of two. A total number N of configurations may be $N = \Sigma_k^K L_k A_k$. Index k may include number of FPGAs at a datacenter, $L_k$ may be a number of placements, and $A_k$ may include number of arrangements for an FPGA k. N may be a large value (e.g., 100, 1000, etc.). A placement and arrangement of a co-processor may be removed from a list upon configuration of the co-processor with a selected placement and a selected arrangement. Use of alternative arrangements and placements to configure the co-processor may prevent cloud cartography.

Figure 3:
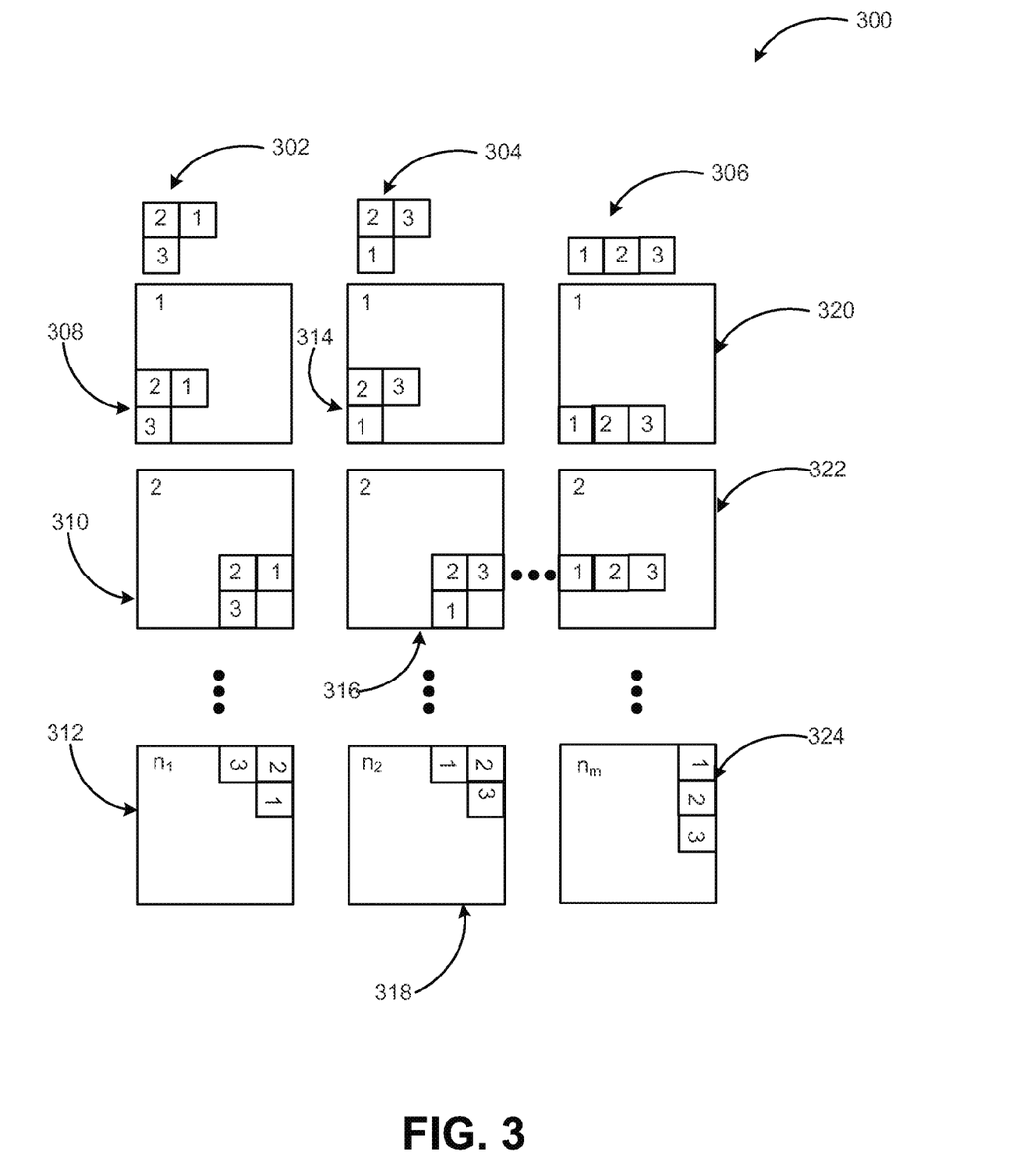
FIG. 3 illustrates an example of malicious attack prevention through rearrangement of co-processors at a datacenter.

FIG. 3 illustrates an example of malicious attack prevention through rearrangement of co-processors at a datacenter, arranged in accordance with at least some embodiments described herein.

As depicted, a diagram 300 shows example arrangements and placements for a co-processor. In an example scenario, components of a co-processor may be configured based on a first arrangement 302. The co-processor may be positioned according to any one of a first placement 308, a second placement 310, or an nth placement 312, where the nth placement 308 may be a rotation of the co-processor. The alternative placements may be enumerated based on attributes of the co-processor including size, number of components, and similar ones and attributes of an FPGA including size, layout, and similar ones.

In another example scenario, the components of the co-processor may be configured based on a second arrangement 304. The co-processor may be positioned according to one of a first placement 314, a second placement 316, or an nth placement 318 as shown in the diagram. In yet another example scenario, the components of the co-processor may be configured based on an mth placement 306. The co-processor may be positioned according to a first placement 320, a second placement 322, or an nth placement 324 based on attributes of the co-processor including size, number of components, and similar ones and attributes of the FPGA including size, layout, and similar ones.

Number of placements for each arrangement may be varied. In an example scenario, the number of placements for the first arrangement 302 may be less than number of arrangements for the mth arrangement 306 based on placement limitations including size of the co-processor, the FPGA, and similar ones.

A placement of a rotated co-processor at 90, 180, or 270 degrees may be selected during configuration. The configuration matrix may be updated to remove the used arrangement and used placement configuration from list of unused arrangements and unused placements associated with the co-processor or co-processor type.

Figure 4:
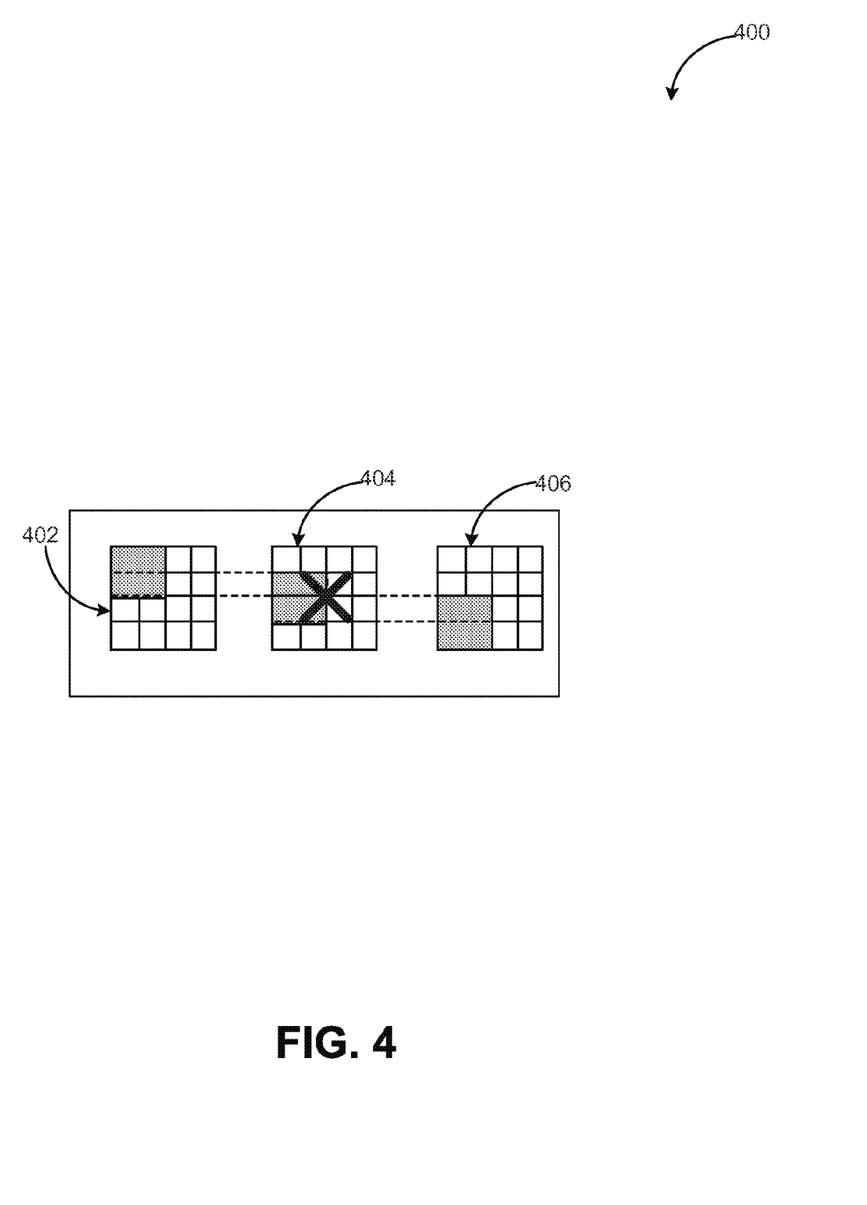
FIG. 4 illustrates another example of malicious attack prevention through placement of co-processors at a datacenter.

FIG. 4 illustrates another example of malicious attack prevention through placement of co-processors at a datacenter, arranged in accordance with at least some embodiments herein.

As shown in a diagram 400, example placements may or may not be used to position a co-processor in an FPGA. A placement 402 and a placement 406 may be potential placements for a co-processor. However, a placement 404 may include components that overlap with the placement 402 or the placement 406. As such, the placement 404 may be removed from a list of unused placements to prevent fingerprinting of the co-processor through overlapped components with alternative placements.

According to some embodiments, placement and arrangement of a co-processor may be varied while configuring the co-processor at an FPGA to prevent cloud cartography. A co-processor may be described as a completed circuit in a binary format called a bitstream suitable to configure a portion of the FPGA as one or more circuits of the co-processor. A bitstream format may be proprietary in some examples. As such, the bitstream format may be decoded and decompiled to a hardware description language (HDL) for preparing a configuration for a co-processor at the FPGA. A datacenter may consume a configuration of a co-processor in a reconfigurable format such as HDL to generate placements for the co-processor at the FPGA. The datacenter or an external source may use design applications to wire components of the co-processor dynamically to determine the placements.

According to other embodiments, the number of arrangements may be limited based on input/output (I/O) connection points of the components. A design application may provide arrangements by portioning the co-processor to components with defined connection points. In response to a selection of a placement (e.g., by the configuration controller or a user), the components may be wired together at the connection points. The wiring may be implemented with an awareness of fixed resources at an FPGA. In addition, the design application may consider limits associated with wiring distance when components of a co-processor are not adjacent to each other. The design application may use wiring under other co-processors to connect components. In addition, the design application may consider increased signal times corresponding to increased wiring distances that may create timing issues when transmitting instructions between components of the co-processor. The design application may wire the components based on predetermined distance thresholds to prevent timing issues. Predetermined distance thresholds may be consumer or system configurable.

Figure 5:
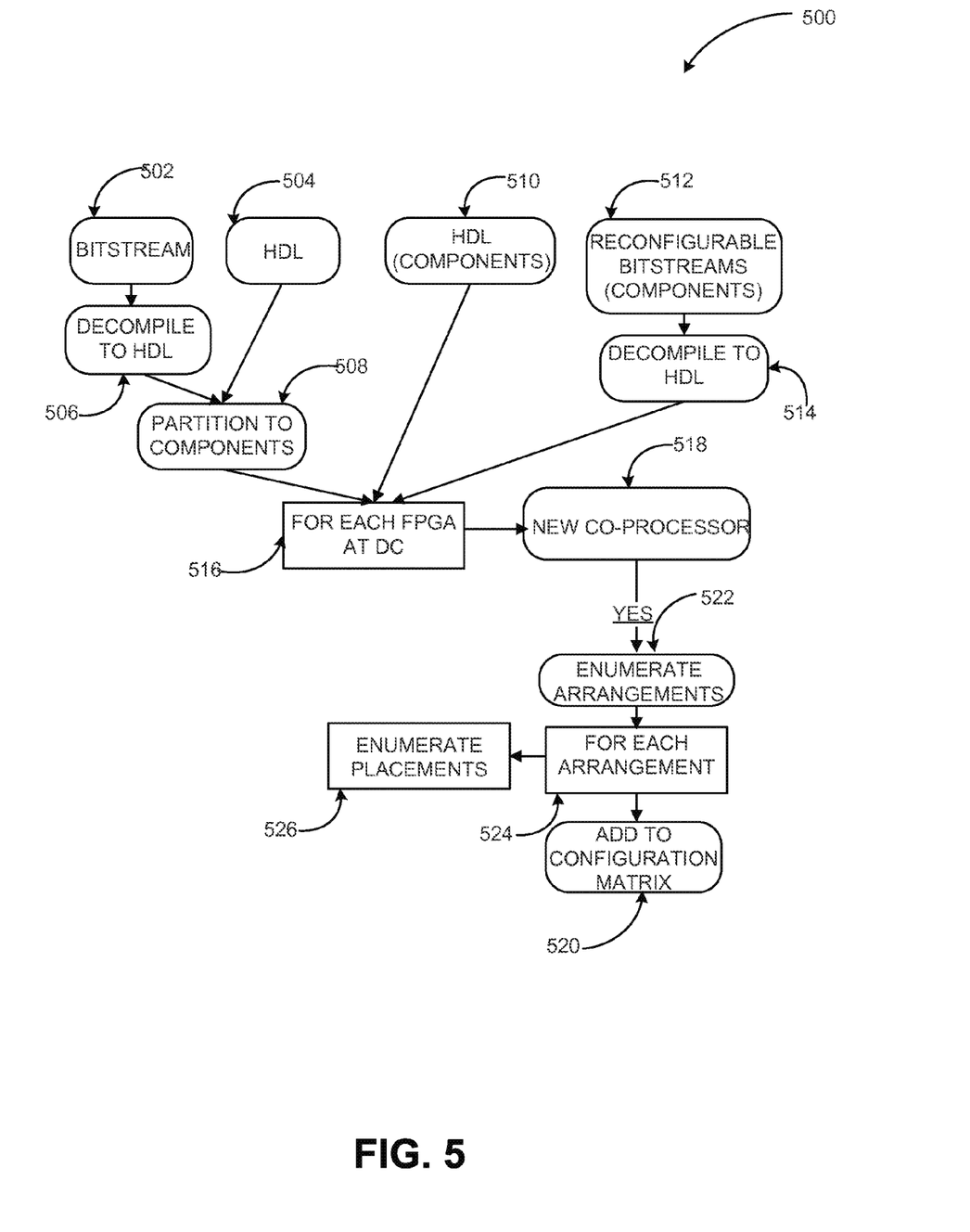
FIG. 5 illustrates an example action diagram for prevention of malicious attacks through cartography of co-processors at a datacenter.

FIG. 5 illustrates an example action diagram for prevention of malicious attacks through cartography of co-processors at a datacenter, arranged in accordance with at least some embodiments herein.

A diagram 500 shows operations in generating configurations including arrangements and placements for a co-processor in a FPGA. At an operation 506 (DECOMPILE TO HDL), a bitstream describing a configuration of a co-processor may be decompiled to HDL configuration by a configuration controller. The decompiled HDL configuration or an HDL configuration 504 may be partitioned to components of the co-processor by the configuration controller, at an operation 508 (PARTITION TO COMPONENTS).

Alternatively, reconfigurable bitstreams of components 512 may be decompiled to HDL configurations at an operation 514 (DECOMPILE TO HDL). HDL configurations 510 or other HDL descriptions of components, as described previously, may be processed for each FPGA at a datacenter (516).

In response to determining a new co-processor 518 or co-processor type not found in a configuration matrix, arrangements associated with the co-processor may be enumerated by the configuration controller at an operation 522 (ENUMERATE ARRANGEMENTS). For each arrangement 524, placements associated with each arrangement may be enumerated by the configuration controller at an operation 526 (ENUMERATE PLACEMENTS). Next, configurations including the arrangements and placements may be added to the configuration matrix by the configuration controller at an operation 520 (ADD TO CONFIGURATION).

Figure 6:
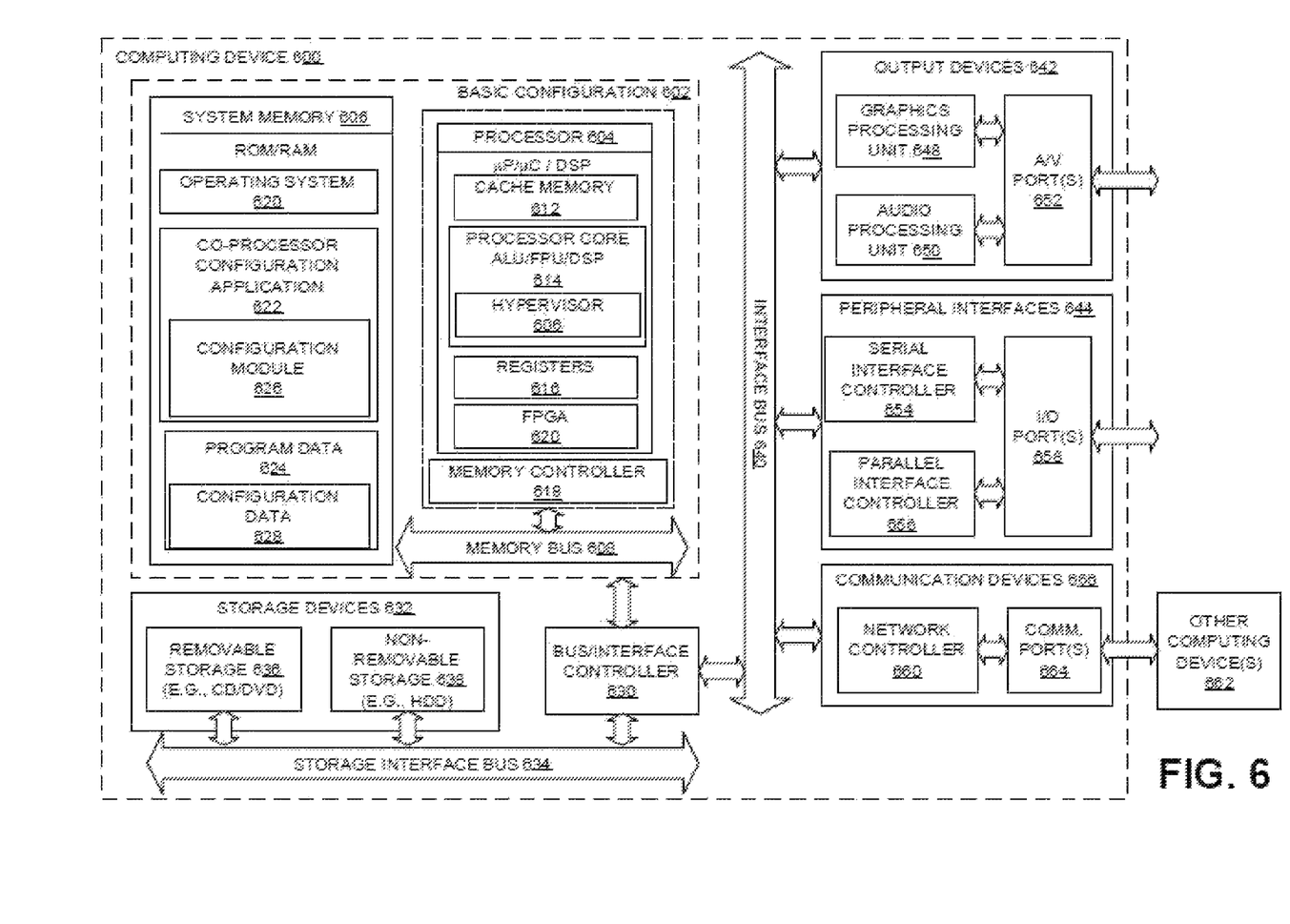
FIG. 6 illustrates a general purpose computing device, which may be used to prevent malicious attacks through cartography of co-processors at a datacenter.

FIG. 6 illustrates a general purpose computing device, which may be used to prevent malicious attacks through cartography of co-processors at a datacenter, arranged in accordance with at least some embodiments described herein. The computing device 600 of the FIG. 6 may be one or more of a SoC 114 or a SoC 214 of a datacenter, or some other device that is not shown in FIGS. 1, 2, 3, 4, and 5. In a configuration 602, computing device 600 typically includes one or more processors 604 and a system memory 606. A memory bus 608 may be used for communicating between processor 604 and system memory 606.

Depending on a particular configuration, processor 604 may be of any type including but not limited to a microprocessor (µP), a microcontroller (µC), a Digital Signal Processor (DSP), or any combination thereof. Processor 604 may include one more levels of caching, such as a cache memory 612, a processor core 614, registers 616, and a field gate programmable array (FPGA) 620. Example processor core 614 may include an Arithmetic Logic Unit (ALU), a floating point unit (FPU), a Digital Signal Processing core (DSP Core), or any combination thereof. In other embodiments, the example processor core 614 may include a hypervisor 606. An example memory controller 618 may also be used with processor 604, or in some implementations, memory controller 618 may be an internal part of processor 604.

Depending on the particular configuration, system memory 606 may be of any type including but not limited to volatile memory (such as RAM), non-volatile memory (such as ROM, flash memory, etc.) or any combination thereof. System memory 606 may include an operating system 620, one or more co-processor configuration application 622, and a program data 624. The co-processor configuration application 622 may include a configuration module 626 that is configured to prevent malicious attacks through cartography of co-processors at a datacenter as described herein. A program data 624 may include one or more of configuration data 628 and similar data as discussed above in conjunction with at least FIGS. 1, 2, 3, 4, and 5. This data may be useful for malicious attack prevention through cartography of co-processors at a datacenter as described herein. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and Hard-Disk Drives (HDDs), optical disk drives such as Compact Disk (CD) drives or Digital Versatile Disk (DVD) drives, Solid State Drives (SSDs), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM. EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store information and which may be accessed by computing device 600. Any such computer storage media may be part of computing device 600.

Computing device 600 may also include an interface bus 640 for facilitating communication from various interface devices (for example, output devices 642, peripheral interfaces 644, and communication devices 666 to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 666 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a physical server, virtual server, a computing cloud, or a hybrid device that include any of the above functions. Computing device 600 may also be implemented as a personal computer including both laptop computer and non-laptop computer configurations. Moreover, computing device 600 may be implemented as a networked system or as part of a general purpose or specialized server.

Networks for a networked system including computing device 600 may comprise any topology of servers, clients, switches, routers, modems, Internet service providers, and any appropriate communication media (for example, wired or wireless communications). A system according to embodiments may have a static or dynamic network topology. The networks may include a secure network such as an enterprise network (for example, a LAN, WAN, or WLAN), an unsecure network such as a wireless open network (for example, IEEE 802.11 wireless networks), or a world-wide network such (for example, the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Figure 7:
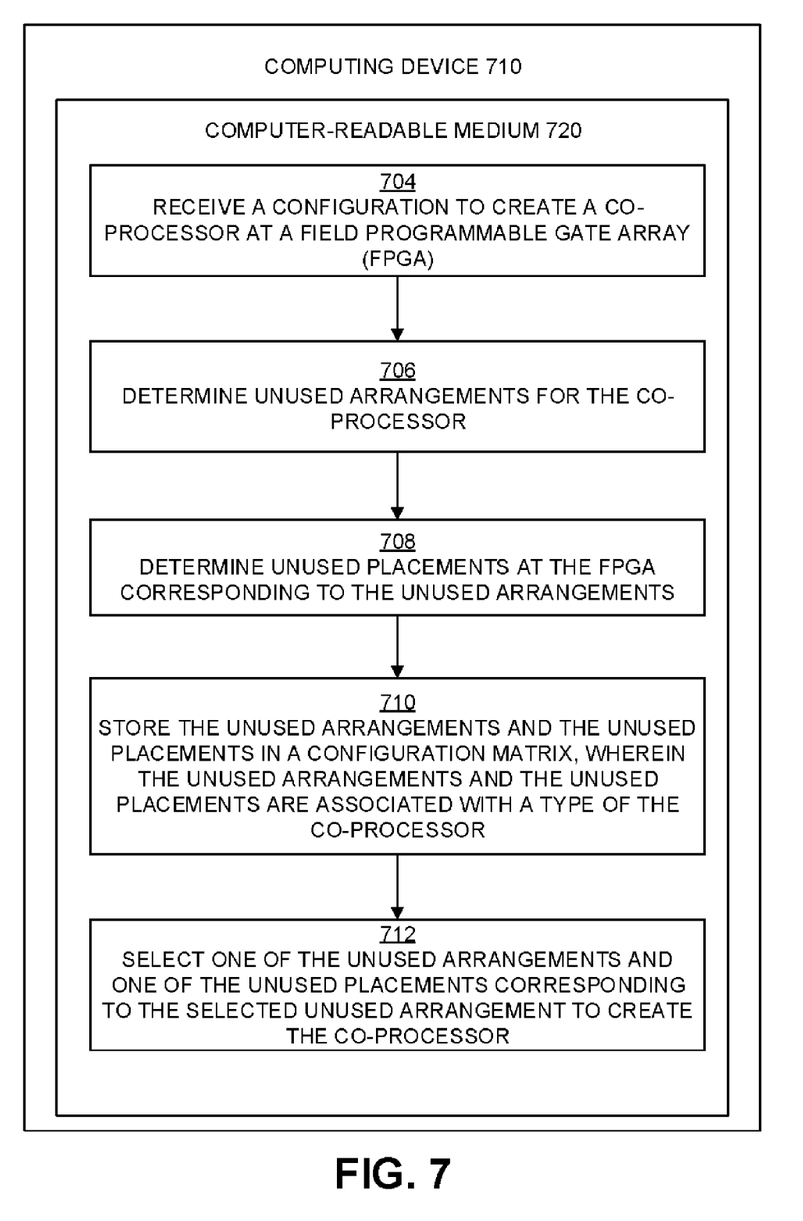
FIG. 7 is a flow diagram illustrating an example method to prevent malicious attacks through cartography of co-processors at a datacenter.

FIG. 7 is a flow diagram illustrating an example method to prevent malicious attacks through cartography of co-processors at a datacenter that may be performed by a computing device 710, such as the computing device 600 in FIG. 6, arranged in accordance with at least some embodiments described herein.

The computing device 710 may be embodied as computing device 600, or similar devices executing instructions stored in a non-transitory computer-readable medium 720 for performing the method. A process to prevent malicious attacks through cartography of co-processors at a datacenter may include one or more operations, functions or actions as is illustrated by one or more of blocks 704, 706, 708, 710, and/or 712.

Some example processes may begin with operation 704, "RECEIVE A CONFIGURATION TO CREATE A CO-PROCESSOR AT A FIELD PROGRAMMABLE GATE ARRAY (FPGA)." At operation 704, a computing device 600 may receive the configuration that includes instructions to construct a co-processor CP3 (126) within an FPGA 120.

Operation 704 may be followed by operation 706, "DETERMINE UNUSED ARRANGEMENTS FOR THE CO-PROCESSOR." At operation 706, the computing device 600 may generate unused arrangements by portioning the co-processor CP3 (126) to components with defined connection points.

Operation 706 may be followed by operation 708, "DETERMINE UNUSED PLACEMENTS AT THE FPGA CORRESPONDING TO THE UNUSED ARRANGEMENTS." At operation 708, the computing device 600 may include rotation of the co-processor CP3 (126) by 90, 180, or 270 degrees as unused placements.

Operation 708 may be followed by operation 710, "STORE THE UNUSED ARRANGEMENTS AND THE UNUSED PLACEMENTS IN A CONFIGURATION MATRIX. WHEREIN THE UNUSED ARRANGEMENTS AND THE UNUSED PLACEMENTS ARE ASSOCIATED WITH A TYPE OF THE CO-PROCESSOR." At operation 710, the computing device 600 may store the unused arrangements and the unused placements in a data store or a data file serving as the configuration matrix 226.

Operation 710 may be followed by operation 712, "SELECT ONE OF THE UNUSED ARRANGEMENTS AND ONE OF THE UNUSED PLACEMENTS CORRESPONDING TO THE SELECTED UNUSED ARRANGEMENT TO CREATE THE CO-PROCESSOR." At operation 712, the computing device 600 may update the configuration matrix 226 to remove the used arrangement and used placement configuration from a list of unused arrangements and unused placements associated with the co-processor CP3 (126).

Figure 8:
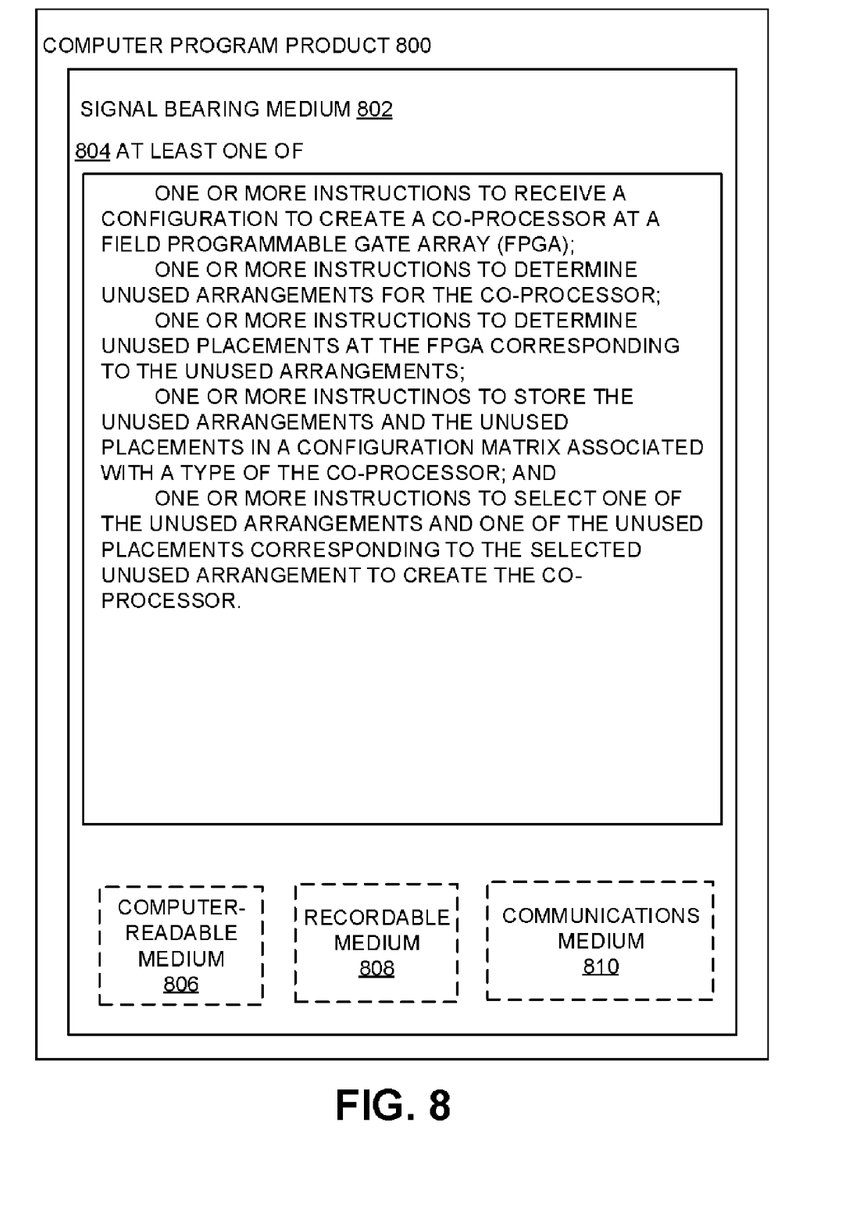
FIG. 8 illustrates a block diagram of an example computer program product to prevent malicious attacks through cartography of co-processors at a datacenter; all arranged in accordance with at least some embodiments described herein.

FIG. 8 illustrates a block diagram of an example computer program product to prevent malicious attacks through cartography of co-processors at a datacenter, arranged in accordance with at least some embodiments described herein.

In some examples as shown in FIG. 8, computer program product 800 may include a signal bearing medium 802 that may also include machine readable instructions 804 that, in response to execution by, for example, a processor, may provide the functionality described above with respect to FIG. 1 through FIG. 7. Thus, for example, referring to computing device 600, one or more of the tasks shown in FIG. 8 may be undertaken in response to instructions 804 conveyed to the computing device 600 by signal bearing medium 802 to perform actions associated with the instructions 804 conveyed to the computing device 600 by the signal bearing medium 802 to perform actions associated with prevention of malicious attacks through cartography of co-processors at a datacenter as described herein. Some of those instructions may include receiving a configuration to create a co-processor at a field programmable gate array (FPGA), determining unused arrangements for the co-processor, determining unused placements at the FPGA corresponding to the unused arrangements, storing the unused arrangements and the unused placements in a configuration matrix, where the unused arrangements and the unused placements are associated with a type of the co-processor, and selecting one of the unused arrangements and one of the unused placements corresponding to the selected unused arrangement to create the co-processor.

In some implementations, signal bearing medium 802 depicted in FIG. 8 may encompass a non-transitory computer-readable medium 806, such as, but not limited to, a hard disk drive, a Compact Disc (CD), a Digital Versatile Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (for example, a fiber optic cable, a waveguide, a wired communications link, a wireless communication link, etc.). Thus, for example, computer program product 800 may be conveyed to the processor 804 by an RF signal bearing medium 802, where the signal bearing medium 802 is conveyed by a wireless communications medium 810 (for example, a wireless communications medium conforming with the IEEE 802.11 standard).

According to some examples, a method is provided to prevent malicious attacks through cartography of co-processors. An example method may include receiving a configuration to create a co-processor at a field programmable gate array (FPGA), determining unused arrangements for the co-processor, determining unused placements at the FPGA corresponding to the unused arrangements, storing the unused arrangements and the unused placements in a configuration matrix, where the unused arrangements and the unused placements are associated with a type of the co-processor, and selecting one of the unused arrangements and one of the unused placements corresponding to the selected unused arrangement to create the co-processor.

According to other examples, the method may further include apportioning the co-processor into components with defined connection points to determine the unused arrangements. One or more of the components may be rotated, where the components are connectable at the defined connection points within the FPGA. A first component from the components may be replaced with a second component from the components and the second component with the first component, where the components are connectable at the defined connection points within the FPGA. One or more of the components may be placed at a predefined distance from remaining components, where the components are connectable at the defined connection points within the FPGA. The distance may be limited to prevent one or more of: a connection routed under another co-processor and a signal timing increase associated with the predefined distance.

According to further examples, a joint section may be searched between the unused placements and one or more prior placement associated with the type of the co-processor within the FPGA. One or more unused placement may be removed as a candidate for a selection in response to finding the joint section. The joint section may enable a fingerprint having a predetermined size, associated with the co-processor (for example, 16-bit). The predetermined size may include a binary value, a hex number, a digit, and similar ones. In addition, the selected unused arrangement and the selected unused placement may be marked as used in the configuration matrix. The selected unused arrangement and the selected unused placement may be stored as a new configuration in the configuration matrix.

According to other examples, a server is provided to prevent malicious attacks through cartography of co-processors at a datacenter. The server may include a memory configured to store instructions, a controller coupled to the memory and configured to execute a configuration module. The configuration module may be configured to receive a configuration to create a co-processor at a field programmable gate array (FPGA), determine unused arrangements for the co-processor, apportion the co-processor into components with defined connection points to determine the unused arrangements, determine unused placements at the FPGA corresponding to the unused arrangements, store the unused arrangements and the unused placements in a configuration matrix, where the unused arrangements and the unused placements are associated with a type of the co-processor, and select one of the unused arrangements and one of the unused placements corresponding to the selected unused arrangement to create the co-processor.

According to some examples, the configuration module may be further configured to rotate one or more of the components, where a rotation angle to rotate the one or more of the components may include one or more from a set of: 90 degrees, 180 degrees, and 270 degrees, and the components may be connectable at the defined connection points within the FPGA. In addition, the configuration module may be further configured to replace a first component from the components with a second component from the components and the second component with the first component, where the components are connectable at the defined connection points within the FPGA. The configuration module may be further configured to place one or more of the components at a predefined distance from the remaining components, where the components are connectable at the defined connection points within the FPGA, and limit the predefined distance to prevent one or more of: a connection routed under another co-processor and a signal timing increase associated with the predefined distance.

According to further examples, the configuration module may be further configured to search a joint section between the unused placements and one or more prior placement associated with the type of the co-processor within the FPGA where the joint section enables a fingerprint having a predetermined size, associated with the co-processor, and remove one or more unused placement as a candidate for a selection in response to finding the joint section. The predetermined size may include a binary value, a hex number, a digit, and similar ones. In addition, the configuration module may be further configured to mark the selected unused arrangement and the selected unused placement as used in the configuration matrix, and store the selected unused arrangement and the selected unused placement as a new configuration in the configuration matrix.

According to other examples, a computer-readable medium may be provided to prevent malicious attacks through cartography of co-processors at a datacenter. The instructions may cause a method to be performed in response to execution, the method being similar to the methods described above.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (for example, a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that particular functionality is achieved. Hence, any two components herein combined to achieve a particular functionality may be seen as "associated with" each other such that the particular functionality is achieved, irrespective of architectures or intermediate components. Likewise, any two components so associated may also be viewed as being "operably connected", or "operably coupled", to each other to achieve the particular functionality, and any two components capable of being so associated may also be viewed as being "operably couplable", to each other to achieve the particular functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to prevent malicious attacks through cartography of co-processors, the method comprising:
receiving by a server a configuration to create a co-processor at a field programmable gate array (FPGA) based on the cartography of co-processors at a datacenter to prevent the co-processor being maliciously used to map shared resources by hackers;
determining unused arrangements for the co-processor;
apportioning the co-processor into components with defined connection points to determine the unused arrangements;
determining unused placements at the FPGA corresponding to the unused arrangements;
storing the unused arrangements and the unused placements in a configuration matrix, wherein the unused arrangements and the unused placements are associated with a type of the co-processor;

selecting one of the unused arrangements and one of the unused placements corresponding to selected unused arrangement from available room on the FPGA to create the co-processor, and marking the selected unused arrangement and the selected unused placement as used in the configuration matrix.

2. The method of claim 1, further comprising apportioning the co-processor into components with defined connection points to determine the unused arrangements.

3. The method of claim 2, further comprising rotating at least one of the components, wherein the components are connectable at the defined connection points within the FPGA.

4. The method of claim 2, further comprising replacing a first component from the components with a second component from the components and the second component with the first component, wherein the components are connectable at the defined connection points within the FPGA.

5. The method of claim 2, further comprising placing at least one of the components at a predefined distance from remaining components, wherein the components are connectable at the defined connection points within the FPGA.

6. The method of claim 5, further comprising limiting the distance to prevent one or more of: a connection routed under another co-processor and a signal timing increase associated with the predefined distance.

7. The method of claim 1, further comprising searching a joint section between the unused placements and at least one prior placement associated with the type of the co-processor within the FPGA.

8. The method of claim 7, further comprising removing at least one unused placement as a candidate for a selection in response to finding the joint section.

9. The method of claim 7, wherein the joint section enables a fingerprint associated with the co-processor.

10. The method of claim 1, further comprising storing the selected unused arrangement and the selected unused placement as a new configuration in the configuration matrix.

11. A server to prevent malicious attacks through cartography of co-processors at a datacenter, the server comprising:
a memory configured to store instructions; and
a controller coupled to the memory and configured to execute a configuration module, wherein the configuration module is configured to:
receive by the server a configuration to create a co-processor at a field programmable gate array (FPGA) based on the cartography of co-processors at the datacenter to prevent the co-processor being maliciously used to map shared resources by hackers;
determine unused arrangements for the co-processor;
apportion the co-processor into components with defined connection points to determine the unused arrangements;
determine unused placements at the FPGA corresponding to the unused arrangements;
store the unused arrangements and the unused placements in a configuration matrix, wherein the unused arrangements and the unused placements are associated with a type of the co-processor;
select one of the unused arrangements and one of the unused placements corresponding to selected unused arrangement from available room on the FPGA to create the co-processor, and
mark the selected unused arrangement and the selected unused placement as used in the configuration matrix.

12. The server according to claim 11, wherein configuration module is further configured to:
rotate at least one of the components, wherein
a rotation angle to rotate the at least one of the components includes at least one from a set of: 90 degrees, 180 degrees, and 270 degrees, and
the components are connectable at the defined connection points within the FPGA.

13. The server according to claim 11, wherein the configuration module is further configured to:
replace a first component from the components with a second component from the components and the second component with the first component, wherein the components are connectable at the defined connection points within the FPGA.

14. The server according to claim 11, wherein the configuration module is further configured to:
place at least one of the components at a predefined distance from the remaining components, wherein the components are connectable at the defined connection points within the FPGA; and
limit the predefined distance to prevent one or more of: a connection routed under another co-processor and a signal timing increase associated with the predefined distance.

15. The server according to claim 11, wherein the configuration module is further configured to:
search a joint section between the unused placements and at least one prior placement associated with the type of the co-processor within the FPGA wherein the joint section enables a fingerprint associated with the co-processor; and
remove at least one unused placement as a candidate for a selection in response to finding the joint section.

16. The server according to claim 11, wherein the configuration module is further configured to:
store the selected unused arrangement and the selected unused placement as a new configuration in the configuration matrix.

17. A non-transitory computer-readable storage medium with instructions stored thereon to prevent malicious attacks through cartography of co-processors at a datacenter, the instructions in response to execution causing a method to be performed, wherein the method comprises:
receiving by a server a configuration to create a co-processor at a field programmable gate array (FPGA) based on the cartography of co-processors at the datacenter to prevent the co-processor being maliciously used to map shared resources by hackers;
determining unused arrangements for the co-processor;
apportioning the co-processor to components with defined connection points to determine the unused arrangements;
determining unused placements at the FPGA corresponding to the unused arrangements; storing the unused arrangements and the unused placements in a configuration matrix, wherein the unused arrangement and the unused placements are associated with a type of the co\-processor;
selecting one of the unused arrangements and one of the unused placements corresponding to selected unused arrangement from available room on the FPGA to create the co-processor, and
marking the selected unused arrangement and the selected unused placement as used in the configuration matrix.

18. The non-transitory computer-readable storage medium according to claim 17, wherein at least one of the components is rotated by one of: 90 degrees, 180 degrees, or 270 degrees, and wherein the components are connectable at the defined connection points within the FPGA.

19. The non-transitory computer-readable storage medium according to claim 17, wherein the components are connectable at the defined connection points within the FPGA, at least one of the components is placed at a predefined distance from the remaining components, and the predefined distance is limited to prevent one or more of: a connection routed under another co-processor and a signal timing increase associated with the predefined distance.

20. The non-transitory computer-readable storage medium according to claim 17, wherein a joint section is searched between the unused placements and at least one prior placement associated with the type of the co-processor within the FPGA, a fingerprint associated with the co-processor is enabled by the joint section, and at least one unused placement is removed as a candidate for a selection in response to finding the joint section.

* * * * *

UNITED STATES PATENT AND TRADEMARK OFFICE
CERTIFICATE OF CORRECTION

| | | |
|---|---|---|
| PATENT NO. | : 9,237,165 B2 | Page 1 of 1 |
| APPLICATION NO. | : 14/371730 | |
| DATED | : January 12, 2016 | |
| INVENTOR(S) | : Fine et al. | |

It is certified that error appears in the above-identified patent and that said Letters Patent is hereby corrected as shown below:

IN THE SPECIFICATION

In Column 1, Lines 5-6, delete "under 35 US.C. §371" and insert -- under 35 U.S.C. § 371 --, therefor.

In Column 7, Line 54, delete "ROM." and insert -- ROM, --, therefor.

In Column 9, Line 26, delete "MATRIX. WHEREIN" and insert -- MATRIX, WHEREIN --, therefor.

IN THE CLAIMS

In Column 15, Line 4, in Claim 1, delete "co-processor, and" and insert -- co-processor; and --, therefor.

In Column 15, Line 63, in Claim 11, delete "co-processor, and" and insert -- co-processor; and --, therefor.

In Column 16, Line 56, in Claim 17, delete "arrangement and" and insert -- arrangements and --, therefor.

In Column 16, Line 58, in Claim 17, delete "co/-processor;" and insert -- co-processor; --, therefor.

In Column 16, Line 62, in Claim 17, delete "co-processor, and" and insert -- co-processor; and --, therefor.

Signed and Sealed this
Nineteenth Day of April, 2016

Michelle K. Lee
*Director of the United States Patent and Trademark Office*